(12) United States Patent
Kubo et al.

(10) Patent No.: US 11,230,475 B2
(45) Date of Patent: Jan. 25, 2022

(54) HYDROPHOBIC TREATMENT METHOD AND MANUFACTURING METHOD FOR SHEET-LIKE MEMBER USING METHOD

(71) Applicant: Panasonic Intellectual Property Management Co., Ltd., Osaka (JP)

(72) Inventors: Takashi Kubo, Osaka (JP); Taichi Nakamura, Osaka (JP); Shigeaki Sakatani, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 158 days.

(21) Appl. No.: 16/072,487

(22) PCT Filed: Jan. 24, 2017

(86) PCT No.: PCT/JP2017/002248
§ 371 (c)(1),
(2) Date: Jul. 24, 2018

(87) PCT Pub. No.: WO2017/141638
PCT Pub. Date: Aug. 24, 2017

(65) Prior Publication Data
US 2019/0062168 A1   Feb. 28, 2019

(30) Foreign Application Priority Data

Feb. 15, 2016  (JP) .............................. JP2016-025866

(51) Int. Cl.
*C01B 33/159* (2006.01)
*D06M 11/79* (2006.01)
(Continued)

(52) U.S. Cl.
CPC .......... *C01B 33/159* (2013.01); *C01B 33/146* (2013.01); *C01B 33/157* (2013.01); *C07F 7/0805* (2013.01); *D06M 11/79* (2013.01)

(58) Field of Classification Search
None
See application file for complete search history.

(56) References Cited

U.S. PATENT DOCUMENTS 5,866,027 A * 2/1999 Frank ................... B01J 13/0091
                                                                      252/62
6,475,561 B1   11/2002 Schwertfeger
(Continued)

FOREIGN PATENT DOCUMENTS

CN      1044597 C       8/1999
JP      50-085627       7/1975
(Continued)

OTHER PUBLICATIONS

International Search Report of PCT application No. PCT/JP2017/002248 dated Mar. 21, 2017.
(Continued)

*Primary Examiner* — David P Turocy
(74) *Attorney, Agent, or Firm* — McDermott Will and Emery LLP

(57) ABSTRACT

A hydrophobic treatment method is used in which at least one sheet filled with a gelled silicic acid is tilted at least two degrees with respect to a horizontal direction in a hydrophobizing solution, and the gelled silicic acid is hydrophobized. A manufacturing method for a sheet-like member is also used. The manufacturing method includes: a sol preparing step of adjusting the pH of a water glass aqueous solution to obtain a sol solution of silicic acid; an adding step of adding the sol solution to a fiber; a gel step of polymerizing and gelling the sol solution; a hydrophobic treatment step of hydrophobizing the gel with the hydrophobic treat-
(Continued)

ment method; and a drying step of drying the hydrophobized gel.

12 Claims, 6 Drawing Sheets

(51) Int. Cl.
  *C01B 33/157*  (2006.01)
  *C01B 33/146*  (2006.01)
  *C07F 7/08*  (2006.01)

(56) References Cited

U.S. PATENT DOCUMENTS

| | | | |
|---|---|---|---|
| 2001/0034375 A1* | 10/2001 | Schwertfeger | B01J 13/0091 516/98 |
| 2005/0046086 A1* | 3/2005 | Lee | B29C 39/18 264/444 |
| 2009/0029147 A1* | 1/2009 | Tang | B32B 27/40 428/319.1 |
| 2012/0025127 A1* | 2/2012 | Yeo | C01B 33/155 252/62 |
| 2013/0189521 A1* | 7/2013 | Fukuju | C01B 33/16 428/402 |
| 2014/0323589 A1* | 10/2014 | Lazar | B01J 19/1862 514/770 |
| 2015/0082590 A1* | 3/2015 | Tognon | D06B 3/10 28/169 |
| 2016/0029438 A1 | 1/2016 | Sakatani et al. | |
| 2016/0096969 A1 | 4/2016 | Jindal et al. | |

FOREIGN PATENT DOCUMENTS

| | | |
|---|---|---|
| JP | 2001-524439 | 12/2001 |
| JP | 3897125 B | 3/2007 |
| JP | 2009-209282 | 9/2009 |
| JP | 2011190548 A * | 9/2011 |
| WO | 2014/193571 | 12/2014 |
| WO | 2015/094575 A1 | 6/2015 |

OTHER PUBLICATIONS

The Extended European Search Report dated Jan. 28, 2019 for the related European Patent Application No. 17752902.1.
English Translation of Chinese Search Report dated Feb. 3, 2021 for the related Chinese Patent Application No. 201780010048.2.

* cited by examiner

101

201
202

100

FIG. 6A
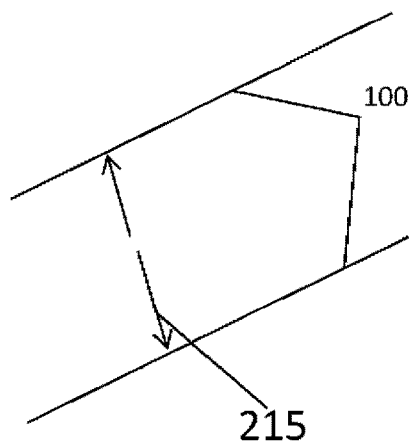
FIG. 6B
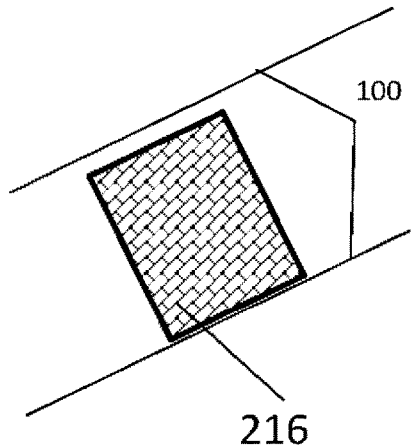
FIG. 6C
FIG. 6D
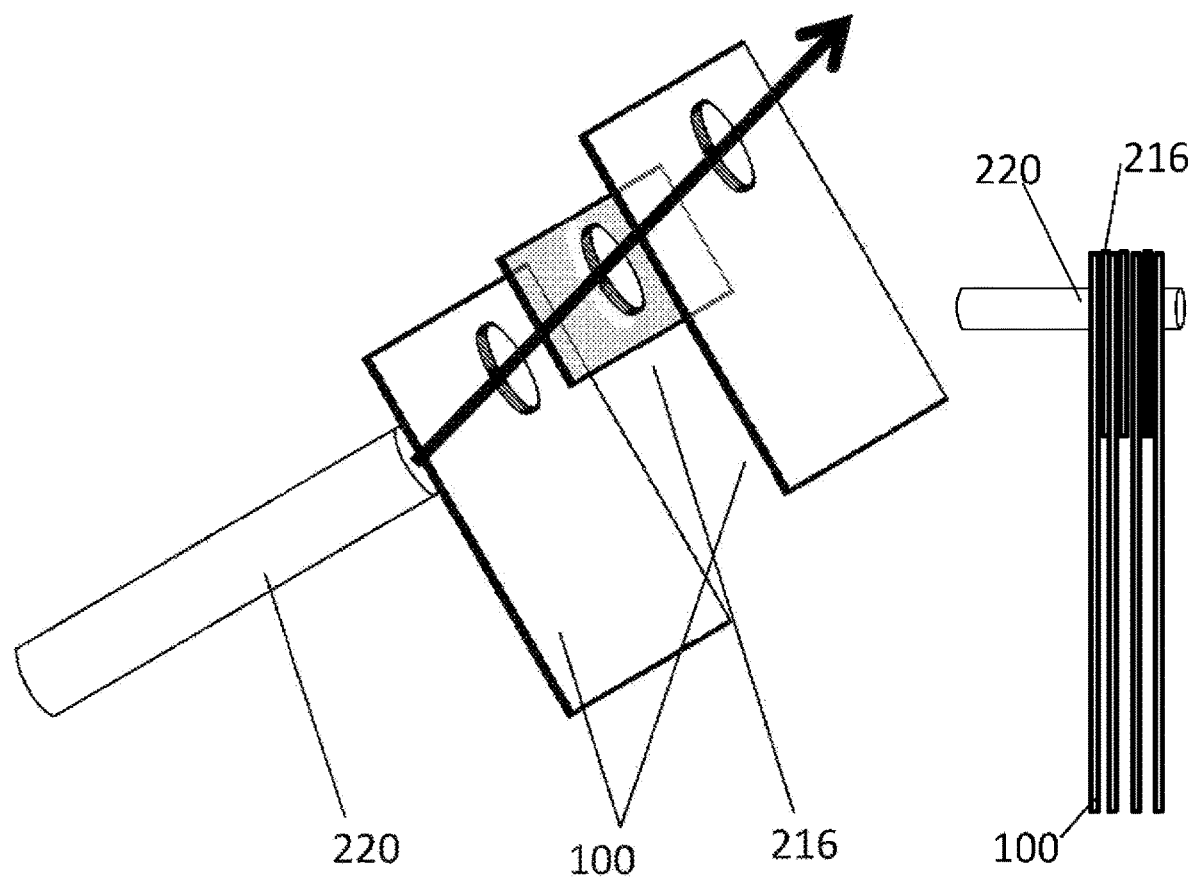

HYDROPHOBIC TREATMENT METHOD AND MANUFACTURING METHOD FOR SHEET-LIKE MEMBER USING METHOD

TECHNICAL FIELD

The technical field relates to a hydrophobic treatment method, and to a method for manufacturing a sheet-like member using same. Particularly, the present disclosure relates to a hydrophobic treatment method for sheet-like members used in casings of various devices including electronic devices and precision instruments, and to a method for manufacturing a sheet-like member using the hydrophobic treatment method.

BACKGROUND

Porous materials, for example, silica aerogel, are composed of a silicon dioxide skeleton, and 90% or more of air. Silica aerogel has an extremely low density of 10 to 150 mg/cm$^3$, and has potential use in a wide range of applications, including acoustic absorbents.

Silica aerogel has a surface hydroxyl group, which makes the silica aerogel highly hydrophilic, and moisture adsorbing. By absorbing moisture, silica aerogel undergoes structural changes such as contraction, and deteriorates through, for example, discoloration. Such deterioration can be prevented by making the silica aerogel hydrophobic.

Another property of silica aerogel is that this material is very brittle. For example, in Japanese Patent No. 3897125, silica aerogel is embedded in a single sheet of fiber. In this way, this related art produces a fiber-reinforced aerogel sheet of 0.5 to 5 mm thick. Specifically, silica gel is embedded in a single sheet of fiber in a gel form. The gel is then allowed to react with a silylation agent to effect silylation, that is, hydrophobization.

SUMMARY

A drawback of the method of the foregoing related art, however, is that the extent of silylation differs in different parts of the fiber sheet. This is in part because the silylation agent enters the fiber sheet in a nonuniform fashion.

It is accordingly an object of the present disclosure to provide a hydrophobic treatment method that enables uniform hydrophobization, and a method for manufacturing a sheet-like member using the hydrophobic treatment method.

According to an aspect of the present disclosure, a hydrophobic treatment method is used that includes tilting at least one sheet filled with a gelled silicic acid at least two degrees with respect to a horizontal direction in a hydrophobizing solution, and hydrophobizing the gelled silicic acid.

According to another aspect of the present disclosure, a method for manufacturing a sheet-like member is used that includes:

a sol preparing step of adjusting the pH of a water glass aqueous solution to obtain a sol solution of silicic acid;

an adding step of adding the sol solution to a fiber;

a gel step of polymerizing and gelling the sol solution;

a hydrophobic treatment step of hydrophobizing the gel with the hydrophobic treatment method; and a drying step of drying the hydrophobized gel.

With the hydrophobic treatment method of the aspect of the present disclosure, a sheet-like object can be uniformly hydrophobized. The present disclosure also provides a method for manufacturing a sheet-like member. The method enables a plurality of sheets to be treated at once. The method uses different treatment vessels for different treatment solutions, making it easier to control the conditions of the hydrophobizing solution. This enables a treatment that can be carried out under the same conditions for extended time periods, and improves the product yield for more efficient mass production.

BRIEF DESCRIPTION OF THE DRAWINGS

FIG. 6A is a cross sectional view representing a method for retaining a gap between the sheets of the embodiment for a hydrophobic treatment.

FIG. 6B is a cross sectional view representing a method for retaining a gap between the sheets of the embodiment for a hydrophobic treatment.

FIG. 6C is a perspective view representing a method for retaining a gap between the sheets of the embodiment for a hydrophobic treatment.

FIG. 6D is a side view representing a method for retaining a gap between the sheets of the embodiment for a hydrophobic treatment.

DESCRIPTION OF EMBODIMENTS

First Embodiment

An embodiment of the present disclosure is a method for producing a sheet 101.

Sheet 101

Figure 1:
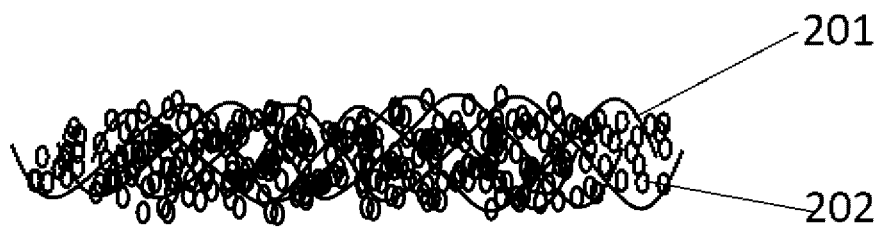
FIG. 1 is a side view of a sheet produced in an embodiment.

The sheet 101 is described first. FIG. 1 shows an enlarged side view of the sheet 101. The sheet 101 has a form combining a fiber 201 and a porous component 202. The fraction of the porous component 202 in the sheet 101 of the present embodiment is 30 weight % to 80 weight %.

This is because the desired function, for example, the sound absorbability of a sheet 100, cannot be sufficiently obtained when the fraction of the porous component 202 is less than 30 weight %. When the fraction of the porous component 202 is 80 weight % or more, the porous component 202 has a possibility of separating from the sheet 101. The sheet 101 also may be used as an adiabatic material.

Fiber 201

The fiber 201 is described below. In the present embodiment, the fiber 201 is a nonwoven fabric of polyethylene. The fiber is not limited to nonwoven fabric, and may be an orderly braided resin, or a fiber sheet prepared by using various weaving techniques.

It is, however, preferable to use a nonwoven fabric because it can more easily accept the porous component (described later) than fiber sheets prepared by using various weaving techniques. The material is not limited to polyethylene, and resin fibers of materials such as polypropylene, polyester, and aramid may be used.

Porous Component 202

The porous component 202 is described below. In the present embodiment, the porous component 202 is a porous component having a porous silicic acid skeleton after the terminal hydrophilic silanol groups of a gelled silicic acid are substituted with trimethylsilyl groups through hydrophobization. In this example, the porous component 202 is a silica aerogel.

The hydrophilic groups before hydrophobization are not limited to silanol groups, provided that the hydrophilic groups are functional groups having a terminal hydroxyl group.

Method of Manufacture of Sheet 101

The following describes an exemplary method of manufacturing the sheet 101.

Step 1 is a solation step of adjusting the pH of a water glass aqueous solution to obtain a sol solution of silicic acid.

Step 2 is an adding step of adding the sol solution to a fiber placed on a film.

Step 3 is a gelation step of polymerizing the silicic acid in the sol solution to complete gelation.

Step 4 is a hydrophobizing step of hydrophobizing the gel.

Step 5 is a drying step of evaporating from the gel an organic solvent used for the hydrophobization.

Details of Step 1

Hydrochloric acid water is added as a catalyst to a silicic acid aqueous solution, and the mixture is stirred to obtain a sol solution. Here, the silica concentration of the silicic acid aqueous solution varies with the required properties of the final product. In this embodiment, the silica concentration is 14%. The hydrochloric acid concentration of the hydrochloric acid water is 12 N in this embodiment.

Details of Step 2

A fiber is placed on a film, and the sol solution is dropped on the fiber. Another film is placed on the fiber, and the fiber between the films is passed between rolls. This pushes the sol solution into the fiber, and the sol solution spreads throughout the fiber. At the same time, the excess sol solution is removed from the fiber. In the present embodiment, the film is PET. However, the film is not limited to PET, provided that it is a material that is not overly adherent to silicic acid.

Details of Step 3

The fiber with the added sol solution is exposed to a high-temperature high-humidity environment to complete gelation. Once gelled, the gel has little fluidity, and does not move even when tilted.

Details of Step 4

The gel is hydrophobized. The hydrophobic treatment method is described in detail using FIG. 2A to FIG. 2C.

Figure 2A:
FIG. 2A is a cross sectional view of a sheet filled with a gelled silicic acid of the embodiment.

FIG. 2A represents a preparation step of preparing a sheet 100 filled with a gelled silicic acid. Specifically, a plurality of sheets 100 after step 3 is horizontally laminated. It should be noted here that it is not necessarily required to laminate the sheet 100. The sheet 100 may be treated one by one.

Figure 2B:
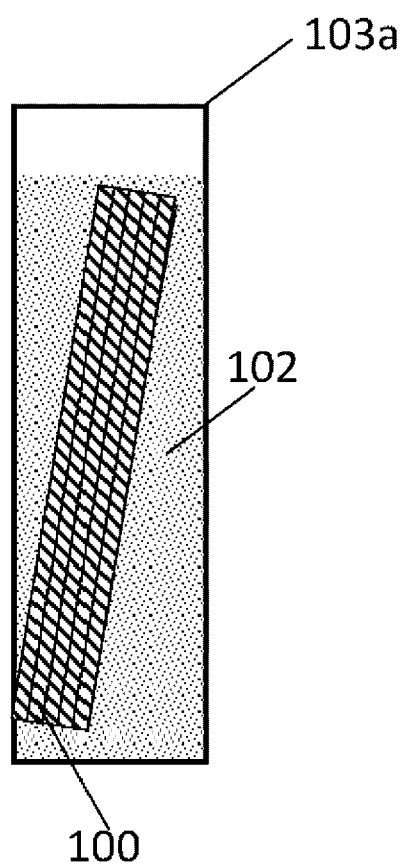
FIG. 2B is a cross sectional view showing a laminate of the sheets of FIG. 2A dipped in a treatment vessel containing hydrochloric acid water.

FIG. 2B represents a first dipping step in which the laminated sheets 100 prepared in FIG. 2A are dipped in a treatment vessel 103a (water-soluble vessel) containing hydrochloric acid water 102.

Figure 2C:
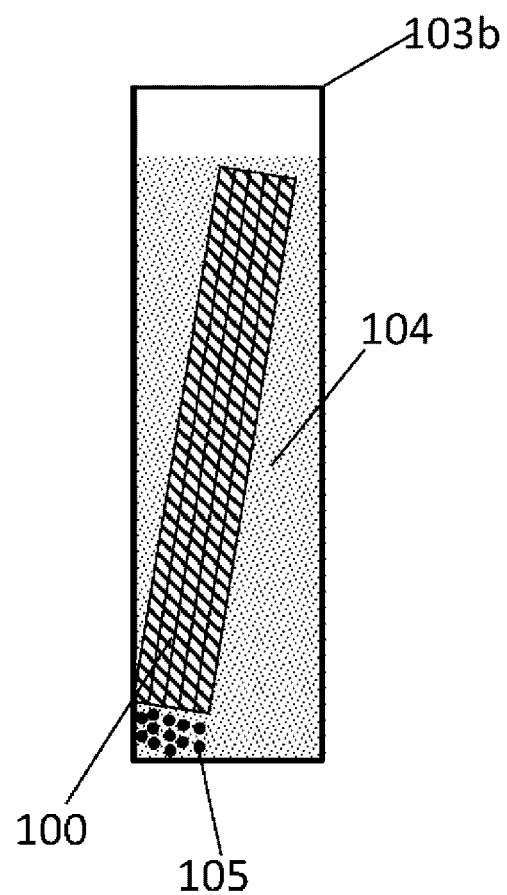
FIG. 2C is a cross sectional view showing the sheet laminate of FIG. 2B dipped in a treatment vessel containing a silylation agent.

FIG. 2C represents a second dipping step in which the laminated sheets 100 from FIG. 2B are dipped in a treatment vessel 103b (water-insoluble vessel) containing a silylation agent 104.

Details of Step 5

In this step, the excess organic solvent adhering to the sheets 100 after the hydrophobization is evaporated.

Reaction Process in Hydrophobic Treatment of Step 4

In this embodiment, the silanol groups that are present as hydrophilic groups at the terminals of the gelled silicic acid of the water glass aqueous solution are hydrophobized. This is achieved in two steps—the first dipping step and the second dipping step shown in FIGS. 2B and 2C.

First Dipping Step

The first dipping step shown in FIG. 2B is described first in detail.

In the first dipping step shown in FIG. 2B, it is ensured that the hydrochloric acid component is near the silanol groups at the terminals of the gelled silicic acid. To this end, the sheet 100 filled with the gelled silicic acid is completely dipped in the hydrochloric acid water 102.

The hydrochloric acid concentration of the hydrochloric acid water 102 is desirably 4 N to 12 N. When the hydrochloric acid concentration is less than 4 N, the substitution reaction with the hydrophobic group (described later) does not sufficiently take place. With a hydrochloric acid concentration of 12 N or more, the hydrochloric acid cannot fully dissolve in water.

Second Dipping Step

The second dipping step shown in FIG. 2C is described below in detail.

The sheet 100 is sent to the second dipping step after it was impregnated with the hydrochloric acid in the first dipping step.

In the second dipping step of FIG. 2C, the silylation agent 104 reacts with the hydrochloric acid in the hydrochloric acid water 102, and the silanol groups are substituted with hydrophobic groups.

Preferably, the second dipping step does not involve stirring. When the solution is stirred, the gel might separate from the fiber of the sheet 100 under the pressure of water. Another reason is that the by-product water interferes with the reaction when it is introduced to the reaction field in the treatment vessel 103b.

Preferably, the first dipping step involves little stirring for hydrochloric acid exchange.

In the embodiment, an organic solvent having a trimethylsilyl group is used as the silylation agent 104. The organic solvent decomposes by the reaction with the hydrochloric acid water 102, and the terminal silanol groups of the porous component are substituted with trimethylsilyl groups to change its property from hydrophilic to hydrophobic.

The organic solvent having a trimethylsilyl group is hydrophobic, and, for example, isopropyl alcohol may be introduced as an amphiphatic organic solvent in the hydrophobic treatment for the purpose of improving affinity to the hydrophilic group of the porous component.

However, such an amphiphatic organic solvent should be kept below about 45 weight % because the hydrophobization time increases, rather than decreases, when an amphiphatic organic solvent is added in amounts that interfere with the opportunity of the reaction between the silanol groups of the porous component and the trimethylsilyl group.

The silylation agent 104 may be heated to promote the substitution reaction between the silanol group and the trimethylsilyl group. However, the heating temperature should be kept below the boiling point of the silylation agent 104, or the boiling point of the optionally added amphiphatic organic solvent, because it otherwise evaporates the silylation agent 104 and the amphiphatic organic solvent, and makes it difficult to control the solution volume and concentration.

Reasons for Dividing Dipping Process into First Dipping Step and Second Dipping Step The following describes the reasons for dividing the dipping process into the first dipping step of FIG. 2B, and the second dipping step of FIG. 2C.

If the first dipping step and the second dipping step were a single step, the silylation agent 104 would situate itself on the hydrochloric acid water 102 in the treatment vessel because of specific gravity.

When the sheet 100 filled with the gelled silicic acid is pulled out into the region of the silylation agent 104 after the sheet 100 is dipped in the region of the hydrochloric acid water 102, the excess hydrochloric acid water becomes incorporated in the silylation agent 104, and the by-product water is introduced to the reaction field in large amounts.

Shape of Sheet 100

The following describes the shape of the sheet 100 filled with a gelled silicic acid according to the present embodiment.

In the preparation step of FIG. 2A, the sheet 100 may have the shapes illustrated in FIGS. 3A to 3H.

Figure 3A:
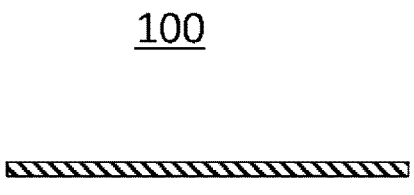
FIG. 3A is a side view of an example of the sheet of the embodiment.
Figure 3B:
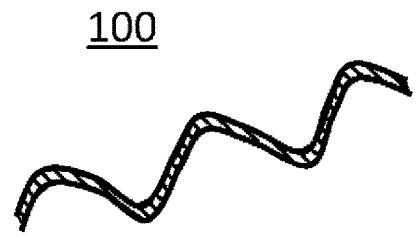
FIG. 3B is a side view of another example of the sheet of the embodiment.
Figure 3C:
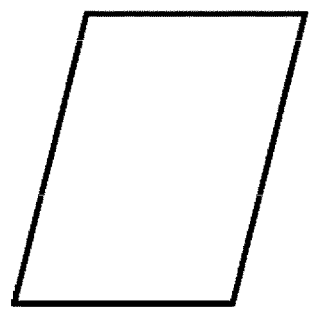
FIG. 3C is a plan view of another example of the sheet of the embodiment.
Figure 3D:
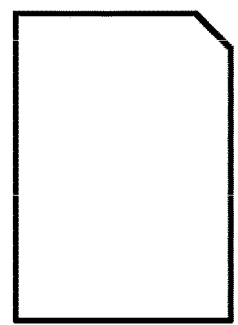
FIG. 3D is a plan view of another example of the sheet of the embodiment.
Figure 3E:
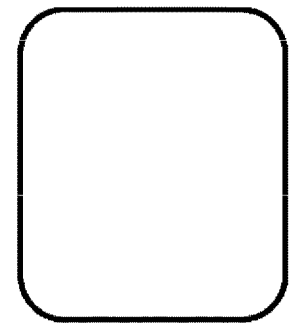
FIG. 3E is a plan view of another example of the sheet of the embodiment.
Figure 3F:
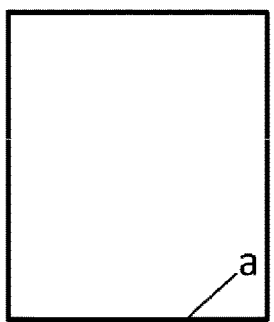
FIG. 3F is a plan view of another example of the sheet of the embodiment.
Figure 3G:
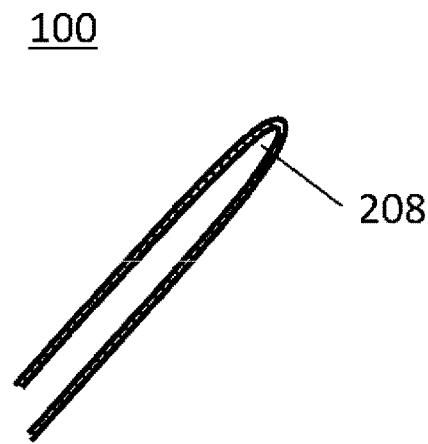
FIG. 3G is a side view of another example of the sheet of the embodiment.

FIGS. 3A, 3B, and 3G are side views. FIGS. 3C to 3F, and FIG. 3H are plan views.

The shape of the sheet 100 is described below in greater detail.

Desirably, the sheet 100 filled with a gelled silicic acid is a flat sheet as viewed from the side. However, the sheet 100 may be a curved sheet, as illustrated in FIG. 3B.

When the sheet 100 is a flat sheet, the shape of the flat surface is preferably other than a quadrangle and a rectangle, as illustrated in FIGS. 3C to 3E.

When the sheet 100 has a square or a rectangle shape, the sheet 100 easily adheres to other sheets 100 when laminated. This makes the solution treatment difficult.

The sheet 100 illustrated in FIG. 3C has a shape of a parallelogram.

In the sheet 100 of FIG. 3D, one of the corners is cut off. This is to provide a marker for indicating sheet direction, or for sorting the sheets into lots. It is not necessarily required to cut a corner in a straight line.

In the sheet illustrated in FIG. 3E, the corners are rounded. This can be used as a marker for indicating the direction of sheets 100, or for sorting the sheets 100 into lots.

The sheet 100 illustrated in FIG. 3F has an impression 204. Specifically, the sheet 100 has a lot number given to indicate the direction of sheets 100, and to control the sheets in units, such as for traceability. The impression 204 may be an indentation of numbers and/or alphabet letters formed on a surface of the sheet 100. Without the impression 204, the sheet 100 cannot be distinguished from another one after the solution treatment.

Method of Hanging Sheet 100

The sheet 100 filled with a gelled silicic acid in FIGS. 2B and FIG. 2C can be hung for the dipping treatment in the following manner.

Figure 3H:
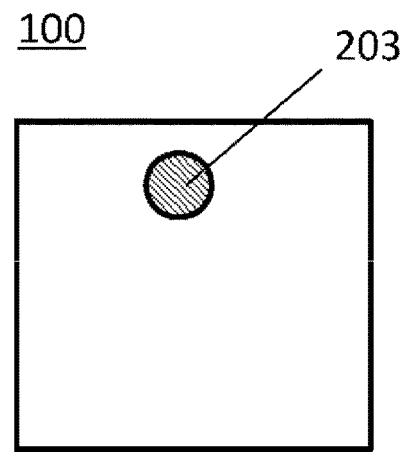
FIG. 3H is a plan view of another example of the sheet of the embodiment.

The sheet 100 can be hung as a folded sheet 100 as illustrated in FIG. 3G, or as a punched sheet 100 as illustrated in FIG. 3H.

In the case of the folded sheet 100 illustrated in FIG. 3G, the sheet 100 filled with a gelled silicic acid is held at a folded portion 201, and dipped in a folded form.

The punched sheet 100 illustrated in FIG. 3H has an opening 203. The sheet 100 is hung for the dipping treatment using the opening 203. With the opening 203, the solution can enter the sheet 100 also from the opening 203, and this helps accelerate the treatment.

Orientation of Sheet 100

The following is a detailed description of the orientation of the sheet 100 filled with a gelled silicic acid in the first dipping step and the second dipping step according to the embodiment.

The plurality of sheets 100 prepared in FIG. 2A is tilted with respect to the horizontal direction in the first dipping step of FIG. 2B, and in the second dipping step of FIG. 2C.

Referring to FIG. 2B, the sheet 100 is placed in such an orientation that the hydrochloric acid component is near the trimethylsilanol groups at the terminals of the gelled silicic acid filling the fiber 201. Here, when the sheets 100 prepared in FIG. 2A are dipped flat in the hydrochloric acid water 102, no gap occurs between the sheets 100 because of the sheet weight, and the hydrochloric acid water 102 cannot soak the middle layers of the sheets 100.

The influence of the sheet weight is reduced by tilting the sheets 100 filled with a gelled silicic acid with respect to the horizontal direction so that the sheets 100 can be soaked throughout with the hydrochloric acid water 102.

In FIG. 2C, the organic solvent is decomposed by reaction with the hydrochloric acid water 102 to substitute the trimethylsilanol groups at the terminals of the gelled silicic acid filling the fiber 201.

As described above, when the sheets are dipped flat in the silylation agent 104, no gap occurs between the sheets 100 because of the sheet weight, and the silylation agent 104 cannot soak the middle layers of the sheets 100.

The influence of the sheet weight is reduced by tilting the sheets 100 so that the sheets 100 can be soaked throughout with the silylation agent 104.

In the embodiment, the sheets 100 need to be maintained in such an orientation that the water component that generates in the hydrophobization reaction in the hydrophobic treatment of the sheets 100 in FIGS. 2B and 2C, and that prevents the reaction can quickly discharge in the gravitational direction.

Figure 4A:
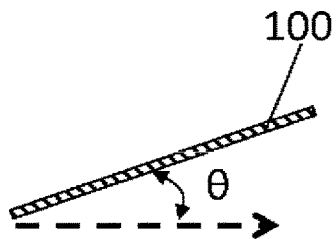
FIG. 4A is a cross sectional view of the sheet of the embodiment being tilted for a hydrophobic treatment.
Figure 4B:
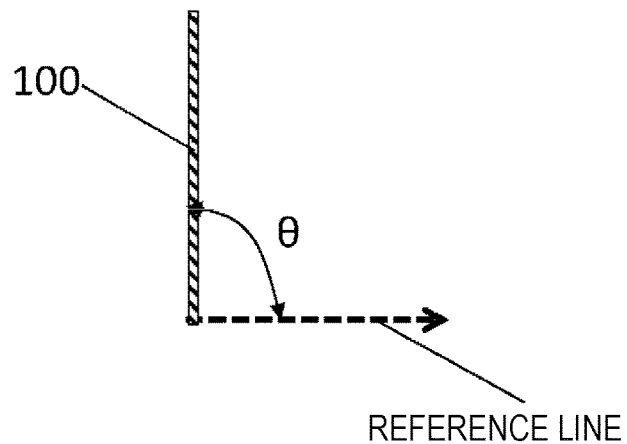
FIG. 4B is a cross sectional view of another example of the sheet of the embodiment being tilted for a hydrophobic treatment.

The tilt angle is described below with reference to the cross sectional views of FIGS. 4A and 4B. The angle θ created by the plane of the sheet 100 with the horizontal direction is preferably 10 degrees (FIG. 4A) to 90 degrees (FIG. 4B). This is needed to reduce the influence of gravity.

Tilting Method of Sheet 100

The following describes four methods of tilting the sheet 100 dipped in the treatment vessel 103a of FIG. 2B, and in the treatment vessel 103b of FIG. 2C, with reference to the cross sectional views of FIGS. 5A to 5D.

Figure 5A:
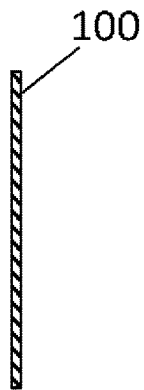
FIG. 5A is a cross sectional view representing a tilting method of the sheet of the embodiment for a hydrophobic treatment.

In FIG. 5A, the sheet 100 is self-standing. To this end, the sheet 100 is made thick. The sheet 100 can stand by itself when it has a thickness of 1 mm or more. The sheet 100 may be placed against a wall of the treatment vessel 103a or the treatment vessel 103b.

Figure 5B:
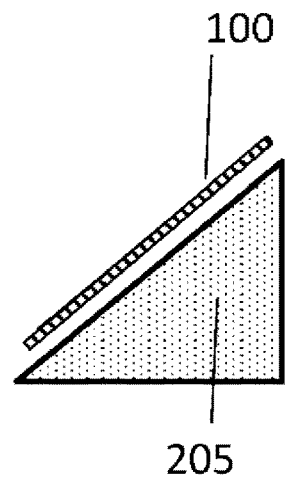
FIG. 5B is a cross sectional view representing another example of the tilting method of the sheet of the embodiment for a hydrophobic treatment.

In FIG. 5B, the sheet 100 is disposed on a slanted surface of a base 205.

Figure 5C:
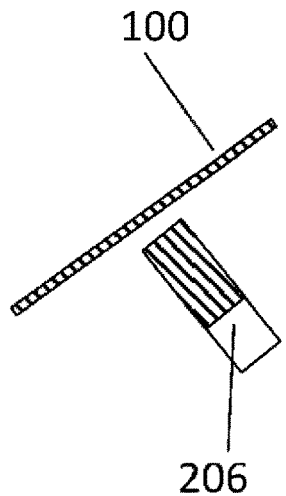
FIG. 5C is a cross sectional view representing another example of the tilting method of the sheet of the embodiment for a hydrophobic treatment.

In FIG. 5C, the sheet 100 is floated by utilizing the buoyancy of a liquid flow from a nozzle 206. The source of a liquid flow is not limited to the nozzle 206, as long as a liquid flow can be generated.

Figure 5D:
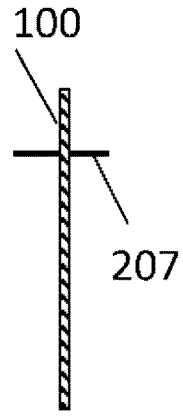
FIG. 5D is a cross sectional view representing another example of the tilting method of the sheet of the embodiment for a hydrophobic treatment.

In FIG. 5D, the sheet 100 is hung with a pin 207. This is achieved by inserting the pin 207 through the opening 203 of the sheet 100 shown in FIG. 3H. The pin 207 also may be used to hang the sheet 100 shown in FIG. 3G, by using the folded portion 208.

The tilting method used in the present embodiment is preferably the method that tilts the sheet 100 by hanging it as shown in FIG. 5D so that the water component 105 can easily discharge as shown in FIGS. 2B and 2C in the dipping treatment in the treatment vessel 103a of FIG. 2B, and in the treatment vessel 103b of FIG. 2C.

Gap Between Sheets 100

Two methods are available for providing a gap between sheets 100, as described below in detail with reference to the cross sectional views of FIGS. 6A to 6B.

FIG. 6A shows a method that keeps a distance by taking advantage of the water-repellent effect. The silanol groups of the sheet 100 are hydrophobized with trimethylsilyl groups during the hydrophobic treatment in the treatment vessel 103b shown in FIG. 2C. This causes the sheets 100 to repel against each other by the water-repellent effect 215, instead of adhering to each other. This creates a distance between the sheets 100. When the sheets 100 are horizontally laid down, a gap does not easily occur because of gravity. However, because the sheets 100 are tilted, and influence of gravity is small, a gap is easily produced. The solution flows in one direction because the sheets 100 are diagonally tilted. This also helps create a gap between the sheets.

FIG. 6B shows a method that forcibly provides a gap as desired, using a spacer 216. When a plurality of sheets 100 is to be treated at once in the steps of FIGS. 2B and 2C, a distance may be forcibly provided between sheets 100 with the spacer 216 as shown in FIG. 6B so that the treatment requires a shorter reaction time.

As an example, the spacer 216 shown in FIG. 6B has about the same width as the sheet 100, and a thickness of 3 mm or more. The width and the thickness of the spacer are not particularly limited.

FIG. 6C is a perspective view of an example using the spacer 216. FIG. 6D is a side view of an example using the spacer 216. The figures describe the sheet 100 being hung with a rod 220 for treatment.

As shown in FIGS. 6C and 6D, the sheet 100 may be treated by being hung with the rod 220.

Effects

With the method described above, the silanol groups in a plurality of sheets 100 filled with a gelled silicic acid are substituted with trimethylsilyl groups in the hydrophobic treatment of FIG. 2C using the treatment vessel 103b, and the sheets 100 are uniformly hydrophobized. The reaction time in the treatment can be reduced by forcibly providing a gap between the sheets 100 with the spacer 216, as illustrated in FIG. 6B.

In this way, the water component 105 that generates in the hydrophobic treatment can easily discharge in the gravitational direction as shown in FIG. 2C, and enables stable hydrophobization. Because the solution can be easily introduced and discharged, a large number of sheets can be treated at the same time.

EXAMPLES AND COMPARATIVE EXAMPLES

The following describes Examples and Comparative Examples. The conditions are shown in Table 1, along with the results.

TABLE 1

| | Number of sheets | Angle with respect to horizontal direction (degrees) | Dipping time for hydrophobization (min) | Evaluation of contact angle for hydrophobization |
|---|---|---|---|---|
| Com. Ex. 1 | 1 | 0 | 30 | Pass |
| Com. Ex. 2 | 10 | 0 | 45 | Fail |
| Com. Ex. 3 | 10 | 0 | 90 | Fail |
| Com. Ex. 4 | 10 | 10 | 30 | Fail |
| Com. Ex. 5 | 10 | 10 | 45 | Fail |
| Com. Ex. 6 | 10 | 45 | 30 | Fail |
| Ex. 1 | 10 | 10 | 90 | Pass |
| Ex. 2 | 10 | 45 | 45 | Pass |
| Ex. 3 | 10 | 45 | 90 | Pass |
| Ex. 4 | 10 | 90 | 30 | Pass |
| Ex. 5 | 10 | 90 | 45 | Pass |
| Ex. 6 | 10 | 90 | 90 | Pass |

In the Examples and Comparative Examples, an A4-size, 1 mm-thick sheet 100 was used after filling it with a gelled silicic acid. The sheets 100 were dipped in the treatment vessel 103a of FIG. 2B, and in the treatment vessel 103b of FIG. 2C under the conditions shown in Table 1 to hydrophobize the sheets 100 filled with the gelled silicic acid. The angle θ in FIG. 5B was varied.

Evaluation Method

The success or failure of hydrophobization was determined as described below with reference to FIG. 7. After the step of FIG. 2C, the excess silylation agent 104 adhering to the sheet 100 filled with a gelled silicic acid was dried to evaporate. Thereafter, 1 cc of water was dropped on the finished sheet 101, and the contact angle was measured. The sheet was determined as being water repellent or fully hydrophobized when the contact angle was 90 degrees or more, as shown in the right diagram of FIG. 7. The sheet was determined as being hydrophilic (i.e., the sheet is not fully hydrophobized, and hydrophobization is insufficient) when the contact angle was less than 90 degrees, as shown in the left diagram of FIG. 7. The results of experiment are described below using Table 1.

Conditions

In Comparative Examples 1 to 3, the sheet 100 was treated in a horizontal state.

In Comparative Examples 4 and 5 and Example 1, the sheet 100 was treated with an angle θ of 10 degrees.

In Comparative Example 6 and Examples 2 and 3, the sheet 100 was treated with an angle θ of 45 degrees.

In Examples 4 to 6, the sheet 100 was treated with an angle θ of 90 degrees.

The dipping time for hydrophobization is as shown in Table 1. The angle θ and the dipping time were evenly varied.

In Comparative Example 1, the time needed to complete the hydrophobization of a single 1 mm-thick sheet 100 filled with a gelled silicic acid was checked. In the case of a single sheet, the silylation agent 104 permeated both sides of the sheet 100 filled with a gelled silicic acid upon dipping the sheet 100 in the silylation agent 104 in the hydrophobic treatment using the treatment vessel 103b, and the hydrophobization was finished in 30 minutes of dipping. Treating the sheet one by one is far too time consuming in actual (practical) applications, and is not applicable to mass production.

In Comparative Examples 2 and 3, ten sheets were laminated, and treated at the same time for examination.

A plurality of sheets 100 filled with a gelled silicic acid was horizontally dipped in the silylation agent 104. Because of the weight of the sheets 100 filled with a gelled silicic acid, a gap did not easily occur between the sheets 100 filled with a gelled silicic acid, and the silylation agent 104, necessary for hydrophobization reaction, failed to soak the middle layer portion of the sheets 100 filled with a gelled silicic acid. The hydrophobization did not proceed to completion even after 45 and 90 minutes of dipping.

This is probably the result of the water component remaining between the sheets 100 filled with a gelled silicic acid in the middle layer portion of the sheets 100 filled with a gelled silicic acid after the water component was generated as a by-product during the hydrophobization reaction, and preventing the silylation agent 104 from soaking the sheets 100 in amounts necessary for hydrophobization reaction, and from taking part in the hydrophobization reaction. Hydrophobization failed also in Comparative Examples 4 to 6, despite setting the angle θ.

EXAMPLES

In Examples 1 to 6, hydrophobization was possible by varying angle θ.

In Examples 1 to 3, hydrophobization was possible when hydrophobization time was increased from Comparative Examples 4 to 6.

In Examples 4 to 6, hydrophobization was possible with increased angles θ, regardless of the hydrophobization time.

The more favorable results over Comparative Examples are probably for the following reason. Because the sheets 100 filled with a gelled silicic acid are tilted (angle θ is set) with respect to the horizontal direction, the influence of the weight of the sheets 100 filled with a gelled silicic acid becomes smaller, and the water component that generates as a by-product during the hydrophobization reaction more easily discharges by itself, allowing the silylation agent 104 to soak the middle layer portion of the sheets 100 filled with a gelled silicic acid.

The angle θ needs to be at least 10 degrees. An angle θ of about degrees is preferable because it enables hydrophobization regardless of the hydrophobization time. The angle θ is preferably more than 45 degrees and 90 degrees or less. The angle θ is more preferably 60 degrees or more and 90 degrees or less.

As a hydrophobization example based on Comparative Examples, the spacer 216 was placed to forcibly provide a gap between the sheets 100 filled with a gelled silicic acid as illustrated in FIG. 6B. This enabled hydrophobization in all of Comparative Examples.

In the embodiment, the sheet 100 filled with a gelled silicic acid has a thickness of 1 mm. However, the thickness is not limited to this. Specifically, the hydrophobization reaction is possibly a reaction that is limited by the rate of diffusion in thickness direction, and the hydrophobization time needs to be appropriately adjusted to different thicknesses. However, this does not defeat the universality of the effects of the present disclosure.

In the first dipping step, hydrochloric acid easily enters the sheet. Accordingly, the tilt angle can be made smaller than in the second dipping step.

With the hydrophobic treatment method for a sheet-like member of the present embodiment, the sheets subjected to hydrophobization are placed in such an orientation that the plane direction of the sheets is 10 to 90 degrees with respect to the horizontal direction. This enables a plurality of sheets to be treated at once, and the sheets can be stably hydrophobized in a uniform fashion for mass production.

Second Embodiment

In the First Embodiment, the sheets 100 are basically treated in the form of a laminate. Second Embodiment examines a treatment of a single sheet 100. A single sheet 100 was dipped in the treatment vessel 103b of FIG. 2C, and tilted in the angles shown in Table 2 for treatment. The treated sheet 100 was evaluated by measuring the distance by which a water droplet moved under its weight on a surface of the sheet 100. The details are as follows. When a water droplet moves, the surface can be regarded as being hydrophobic, and repelling water.

Anything that is not described is as described in the First Embodiment.

TABLE 2

| | Number of sheets treated | Angle with respect to horizontal direction (degrees) | Dipping time for hydrophobization (min) | Distance moved by water droplet (mm) | Evaluation of hydrophobization |
|---|---|---|---|---|---|
| Com. Ex. 7 | 1 | 1.5 | 60 | 0.5 | Fail |
| Ex. 7 | 1 | 2 | 60 | 9 | Pass |
| Ex. 8 | 1 | 3 | 60 | 11.5 | Pass |
| Ex. 9 | 1 | 4 | 60 | 15.5 | Pass |
| Ex. 10 | 1 | 5 | 60 | 20 or more | Pass |

In Examples and Comparative Example, A4-size, 1 mm-thick sheets 100 filled with a gelled silicic acid were used. The sheets 100 were dipped in the treatment vessel 103a of FIG. 2B, and in the treatment vessel 103b of FIG. 2C under the conditions shown in Table 2 to hydrophobize the sheets 100 filled with a gelled silicic acid. The experiment was conducted with the configuration shown in FIG. 5B, and the angle θ was varied.

Evaluation Method

The success or failure of hydrophobization was determined by measuring the distance by which a colored water droplet dropped on the sheet 100 in the treatment vessel 103b moved in 10 seconds after it was dropped. Removability of the water droplet was evaluated by the distance moved by a water droplet. Larger distances mean more uniform hydrophobization.

The colored water droplet is a water droplet mixed with a dye to enable easy measurement. In contrast to the evaluation method of the First Embodiment in which the evaluation was made after drying, the evaluation was made in the treatment vessel 103b in the method of Second Embodiment. This enables a more accurate evaluation.

Figure 7:
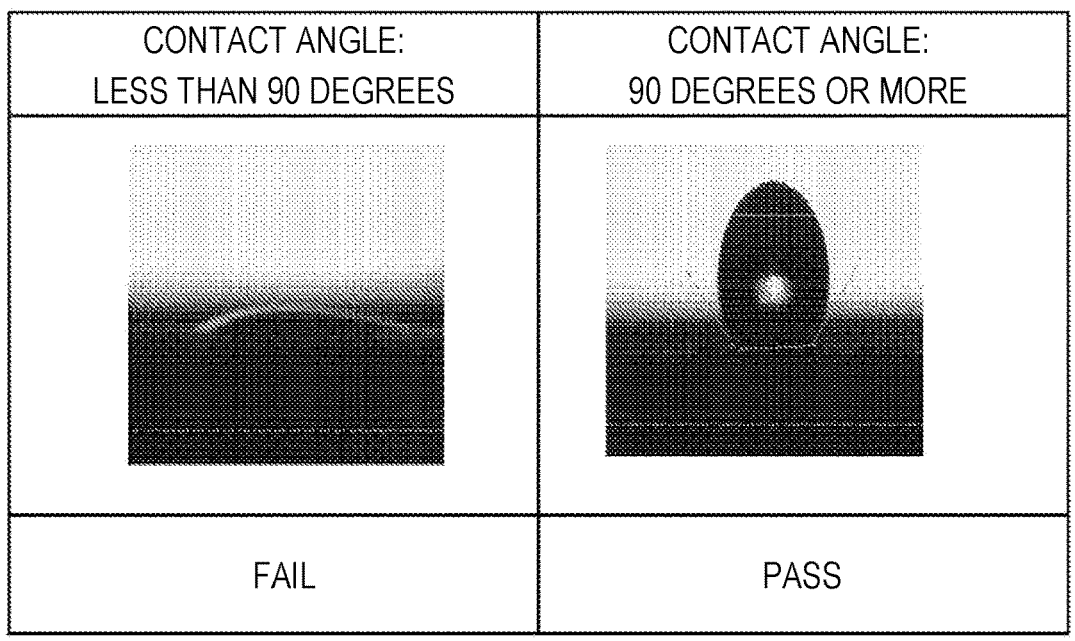
FIG. 7 is a diagram showing pictures of side surfaces, representing the criterion for determining hydrophobization according to the embodiment.

Evaluation is based on the sheet 100 that passed the contact angle test of FIG. 7 in First Embodiment. Specifically, the sheet 100 was determined as being desirable when a water droplet moved by rolling on the passed sheet 100 by a distance of 5 mm or more.

Figure 8:
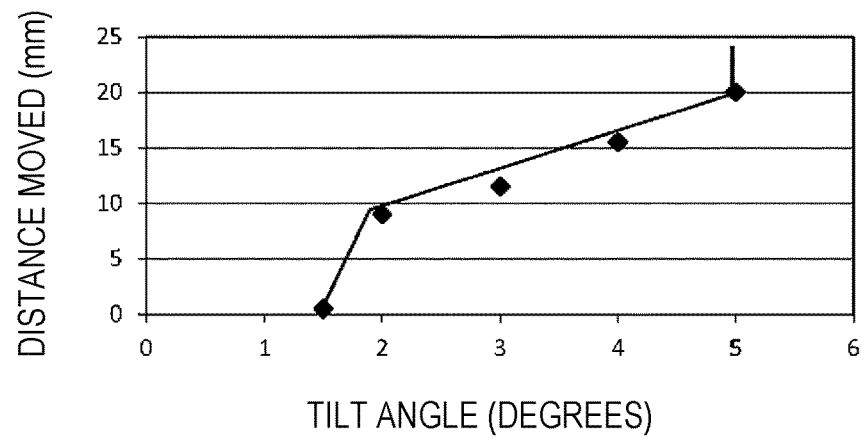
FIG. 8 is a graph representing the relationship between tilt angle and the distance moved by a water droplet according to an embodiment.

The dipping time for hydrophobization is as shown in Table 2. The angle θ was varied. The distance moved by the waste acid abruptly increased as the angle was increased from 2 degrees set in Example 7, demonstrating the effect of tilting. FIG. 8 represents the relationship between tilt angle and the distance moved by a water droplet.

The effect was obtained when the tilt angle was 2 degrees or more. This, together with the foregoing results, shows that the effect can be obtained when the angle is 2 degrees to 90 degrees. It can be seen from FIG. 8 that the 2- and 5-degree angles are critical angles.

Device

Because the effect can be obtained with a tilt angle of 2 degrees or more, the sheet can be produced without using a large-scale device. That is, the sheet 100 can be continuously transferred with ease. Specifically, the device can use the method in which the sheet 100 is placed in the hydrophobizing solution in such an orientation that the plane direction of the sheet 100 is tilted 2 to 90 degrees with respect to the horizontal direction of the sheet 100. That is, the sheet 100 can be continuously transferred for hydrophobization. Continuous production is possible throughout the manufacturing steps.

Figure 9:
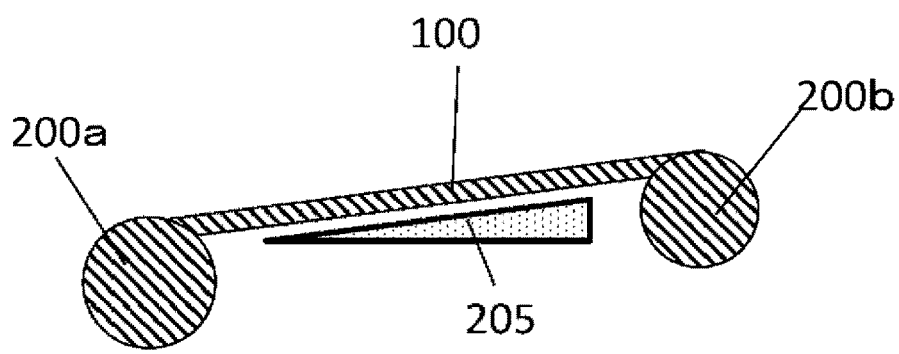
FIG. 9 is a cross sectional view showing a hydrophobization device of an embodiment.

FIG. 9 shows a cross sectional view of a device as a variation of the hydrophobization of FIG. 5B. A roll 200a feeds the sheet 100, and a roll 200b takes up the sheet 100 with the plane direction of the sheet 100 creating an angle of 2 degrees or more with respect to the horizontal direction. In this way, the sheet 100 can be continuously hydrophobized.

In this example, the sheet 100 runs upwardly from the upstream to the downstream side of the rolls. However, the effect of the present embodiment remains the same even when the upstream and the downstream side are reversed.

Specifically, a water droplet can still discharge under the force of gravity even when the sheet 100 runs downwardly from the upstream to the downstream side of the rolls, and the effect of the present embodiment remains the same.

The hydrophobic treatment method of the present disclosure, and the method for manufacturing a sheet-like member using the hydrophobic treatment method are applicable to the production of a wide variety of sheets formed by immobilizing a porous material in a fibrous sheet.

What is claimed is:

1. A hydrophobic treatment method comprising:
   tilting a sheet filled with a gelled silicic acid in a hydrophobizing solution; and
   hydrophobizing the gelled silicic acid,
   wherein the sheet is tilted at an angle of 2 degrees or more and 5 degrees or less with respect to a horizontal direction while the sheet is moved upward in the hydrophobizing solution.

2. The hydrophobic treatment method according to claim 1, wherein the hydrophobizing solution is an organic solvent having a trimethylsilyl group.

3. The hydrophobic treatment method according to claim 1, wherein the sheet includes a fiber and a porous component, the porous component having a hydrophilic group.

4. The hydrophobic treatment method according to claim 3, wherein a concentration of hydrochloric acid is in the range of 4 N to 12 N.

5. The hydrophobic treatment method according to claim 1, wherein a plurality of sheets filled with the gelled silicic acid are hung for the treatment in the hydrophobizing solution.

6. The hydrophobic treatment method according to claim 1, further comprising, after the hydrophobizing:
   treating the sheet with a water-soluble solvent, followed by treating the sheet with a water-insoluble solvent.

7. The hydrophobic treatment method according to claim 6, wherein the water-soluble solvent comprises hydrochloric acid water.

8. The hydrophobic treatment method according to claim 3, wherein an amount of the porous component is in the range of 30 weight % to 80 weight % of the sheet.

9. The hydrophobic treatment method according to claim 6, wherein the water-soluble solvent is stirred when treating the sheet with the water-soluble solvent.

10. The hydrophobic treatment method according to claim 6, wherein the water-insoluble solvent is not stirred in the treating the sheet with the water-insoluble solvent.

11. The hydrophobic treatment method according to claim 1, wherein the sheet is moved by rollers, and the rollers contains a first roller for feeding the sheet and a second roller for taking up the sheet, which creates the angle of 2 degrees or more and 5 degrees or less with respect to a horizontal direction.

12. A method for manufacturing a sheet, the method comprising:
   a sol preparing step of adjusting a pH value of a water glass aqueous solution to obtain a sol solution of silicic acid;
   an adding step of adding the sol solution to a fiber;
   a gel step of polymerizing and gelling the sol solution to form a gelled silicic acid, thereby forming a sheet filled with the gelled silicic acid;
   a hydrophobic treatment step according to claim 1; and
   a drying step of drying the hydrophobized gelled silicic acid.

* * * * *